United States Patent
Yamada et al.

(10) Patent No.: US 8,299,445 B2
(45) Date of Patent: Oct. 30, 2012

(54) LIGHTING APPARATUS FOR CONTROLLING PLANT DISEASE

(75) Inventors: Makoto Yamada, Matsudo (JP); Osamu Kuramitsu, Matsudo (JP); Masaki Ishiwata, Inba-gun (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/669,331

(22) PCT Filed: Jul. 16, 2008

(86) PCT No.: PCT/JP2008/062782
§ 371 (c)(1),
(2), (4) Date: Jan. 15, 2010

(87) PCT Pub. No.: WO2009/011349
PCT Pub. Date: Jan. 22, 2009

(65) Prior Publication Data
US 2010/0193707 A1    Aug. 5, 2010

(30) Foreign Application Priority Data
Jul. 17, 2007    (JP) .................................. 2007-186021

(51) Int. Cl.
*A01N 3/00* (2006.01)
(52) U.S. Cl. ............ 250/455.11; 250/494.1; 250/504 R; 422/22; 422/24; 362/563; 362/805; 47/58.1 LS; 47/58.1 R
(58) Field of Classification Search .................. 362/563, 362/805; 47/58.1 LS, 58.1 R; 250/493.1, 250/503.1, 504 R, 453.11, 454.11, 455.11, 250/494.1; 422/20, 22, 24
See application file for complete search history.

(56) References Cited

U.S. PATENT DOCUMENTS

| | | | |
|---|---|---|---|
| 6,363,656 B1 * | 4/2002 | Byun | 47/61 |
| 2007/0044445 A1 * | 3/2007 | Spicer et al. | 56/10.1 |
| 2007/0205382 A1 * | 9/2007 | Gaska et al. | 250/504 R |
| 2010/0121420 A1 * | 5/2010 | Fiset et al. | 607/94 |

FOREIGN PATENT DOCUMENTS

| | | |
|---|---|---|
| JP | 2003-339236 | 12/2003 |
| JP | 2005328734 | * 2/2005 |
| JP | 2005-328702 | 12/2005 |
| JP | 2005-328734 | 12/2005 |
| JP | 2006-158262 | 6/2006 |
| JP | 2007-89430 | 4/2007 |

OTHER PUBLICATIONS

Japan Office action, mail date is Jun. 7, 2011.

* cited by examiner

*Primary Examiner* — David A Vanore
*Assistant Examiner* — Nicole Ippolito
(74) *Attorney, Agent, or Firm* — Greenblum & Bernstein, P.L.C.

(57) ABSTRACT

Disclosed is a lighting device for use in the control of a plant disease, which has a light source capable of emitting light containing ultraviolet ray. The light source can emit both of UV-B having a wavelength component with a wavelength of about 280 to 340 um and UV-C in which a wavelength component with a wavelength of about 255 nm or less is cut off from wavelength components with wavelengths of about 100 to 280 nm to plant in a superimposed manner. The irradiation of a plant with the UV-C and the UV-B ensures to further inhibit the spore formation or the hypha growth of a filamentous fungus that causes a disease or the like, and to induce a resistance against a disease in the plant.

10 Claims, 4 Drawing Sheets

|  | PESTICIDE USE (CONVENTIONAL CONTROL) | UV-B SINGLE IRRADIATION (CONVENTIONAL EXAMPLE) | UV-C + UV-B COMPOSITE IRRADIATION (PRESENT PREFERRED EMBODIMENT) |
|---|---|---|---|
| RATIO OF DAMAGED PLANTS | 5～20% | 5～10% | 0～3% |
| RATIO OF LEAF SCORCH | 0% | 5～50% | 10～60% |

※NUMBER OF PLANTS IN EACH TEST SECTION : APPROXIMATELY 100
　CROP UNDER TEST : STRAWBERRY

| | UV-C + UV-B + VISIBLE LIGHT COMPOSITE IRRADIATION (PRESENT PREFERRED EMBODIMENT) |
|---|---|
| RATIO OF DAMAGED PLANTS | 0~3% |
| RATIO OF LEAF SCORCH | 0~0.5% |

※NUMBER OF PLANTS IN EACH TEST SECTION : APPROXIMATELY 100
　CROP UNDER TEST : STRAWBERRY

US 8,299,445 B2

LIGHTING APPARATUS FOR CONTROLLING PLANT DISEASE

TECHNICAL FIELD

The present invention relates to a lighting apparatus for controlling a plant disease provided with a light source to emit a light including ultraviolet rays.

BACKGROUND ART

Conventionally, there is a well known lighting apparatus for controlling a plant disease which controls a wavelength component of ultraviolet rays and emits it (refer to Japanese Laid-Open Patent Publication No. 2005-328734, for example). In the above apparatus, the ultraviolet rays are controlled to include a wavelength component in UV-B range (the wavelength range 280 to 340 nm) and set a wavelength component in UV-C range (the wavelength range 100 to 280 nm) to almost zero. This inhibits a spore formation and a hyphal growth of filamentous fungi which cause gray mold, powdery mildew, downy mildew, anthracnose, or the like and thereby has an effect to control the above plant diseases.

However, the technique disclosed by the Publication No. 2005-328734 cannot reliably inhibit the spore formation and the hyphal growth of the filamentous fungi causing the above plant diseases. Moreover, the reliable induction of resistance against the plant diseases is often difficult.

DISCLOSURE OF INVENTION

In order to solve the problem of the conventional art described above, an object of the present invention is to provide a lighting apparatus for controlling a plant disease which can reliably inhibit a spore formation and a hyphal growth of filamentous fungi which cause gray mold, powdery mildew, downy mildew, anthracnose, or the like and can reliably induce a disease resistance to a plant.

A lighting apparatus for controlling a plant disease according to one aspect of the present invention has a light source which emits a light including ultraviolet rays, wherein the light source emits superimposedly UV-B having a wavelength component of approximately 280 to 340 nm and UV-C in which a wavelength component of approximately 255 nm or less is cut off in UV-C having a wavelength of approximately 100 to 280 nm.

According to such a configuration, compared to the conventional configuration, a plant is further irradiated with the ultraviolet rays having wavelength range of approximately 255 to 280 nm, so that the spore formation and the hyphal growth of the filamentous fungi which cause gray mold, powdery mildew, downy mildew, anthracnose, or the like can be inhibited more reliably and moreover, the disease resistance of the plant can be induced more reliably.

BEST MODE FOR CARRYING OUT THE INVENTION

A lighting apparatus for controlling a plant disease according to a first preferred embodiment of the present invention is described with reference to FIGS. 1 to 6. The lighting apparatus for controlling the plant disease (abbreviated as the lighting apparatus hereinafter) is used for controlling a plant disease caused by filamentous fungi (mold) such as gray mold, crown rot, tomato ring spot, white crab, powdery mildew, downy mildew, anthracnose, or the like which occurs during growth of nursery plants of vegetables, flowers, and ornamental plants in a fully-closed plant seedling production system, a protected cultivation using an agricultural plastic greenhouse, glass house, or the like, or an open culture, for example.

Figure 1:
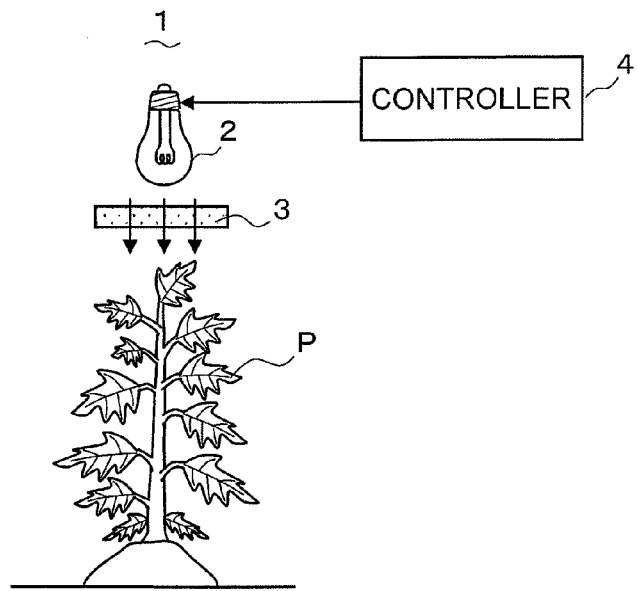
FIG. 1 is a configuration diagram of a lighting apparatus for controlling a plant disease according to a first preferred embodiment of the present invention.

FIG. 1 shows a configuration of a lighting apparatus 1 according to the first preferred embodiment of the present invention. The lighting apparatus 1 has a light source 2 which emits a light including ultraviolet rays and a filter 3 (first filter) which controls a wavelength of the light emitted by the light source 2. A plant P is irradiated with the light which is transmitted through the filter 3. The light source 2 emits superimposedly UV-B having a wavelength component of approximately 280 to 340 nm and UV-C in which a wavelength component of approximately 255 nm or less is cut off in UV-C having a wavelength of approximately 100 to 280 nm to the plant P. The lighting apparatus 1 further has a controller 4 which controls the light source 2 so that a total amount of UV-B and UV-C emitted to an area in the plant P by the light source 2 comes to 50 µW/cm² or less which is the appropriate amount for the plant P.

Figure 2:
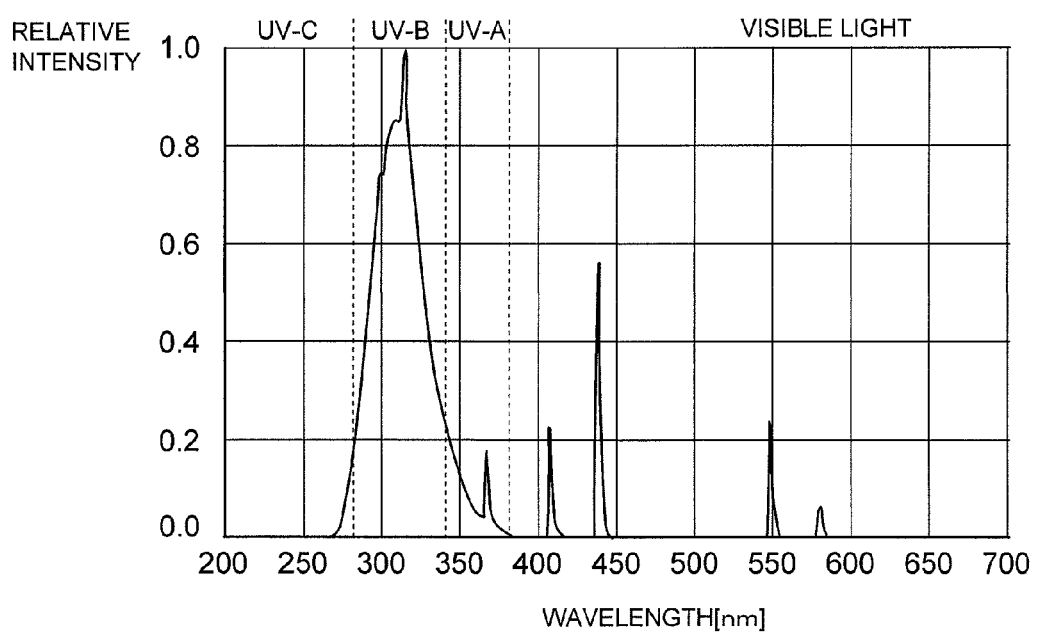
FIG. 2 is a spectral distribution chart of a tanning lamp used as a light source of the lighting apparatus in FIG. 1.

The light source 2 is made up of a fluorescent lamp such as a tanning lamp having a spectral distribution as shown in FIG. 2 (product number GL20E manufactured by Sankyo Denki Co., Ltd.), for example. Dashed lines in FIG. 2 show boundaries among respective wavelength ranges of UV-C, UV-B, UV-A having a wavelength of approximately 340 to 380 nm, and visible light having a wavelength of approximately 380 or more. The above tanning lamp emits a small amount of UV-C and UV-B in which a wavelength component of approximately 255 nm or less is cut off.

The light source 2 can also be made up of a HID lamp (High Intensity Discharged lamp) such as a mercury lamp and metal halide lamp (Skybeam manufactured by Matsushita Electric Industrial Co., Ltd.) which include large amount of ultraviolet component having wavelength of approximately 255 to 380 nm, a xenon lamp which has a continuous emission spectrum in ultraviolet range, for example. The light source 2 is not limited particularly, as long as it emits the UV-C in which the wavelength component of approximately 255 nm or less is cut off and the UV-B.

The filter 3 is made of a glass or a resin, for example, and transmits almost no UV-A in the light emitted by the light source 2. Thus, the wavelength component of approximately 340 to 380 nm in the light which irradiates the plant P is cut off by the filter 3 and reduced to almost zero. When using a metal halide lamp (Skybeam manufactured by Matsushita Electric Industrial Co., Ltd.), a xenon lamp, or the like which has relatively large amount of luminous flux and also includes relatively large amount of wavelength component having ultraviolet range of approximately 300 to 400 nm as the light source 2, the filter 3 is effective.

The controller 4 is made up of a lighting circuit which turns on the light source 2 and a microcomputer which can control the lighting circuit to electrically perform the light control of the light source 2. However, the configuration of the controller 4 is not limited to the above. For example, the light volume of the UV-B and UV-C can also be controlled by using a coating film or evaporated film, which is formed on the lamp of the light source 2, or the filter 3 alone, or using them in combination, respectively. In this case, it is preferable to control the light volume of UV-C to be smaller than that of UV-B.

Figure 3:
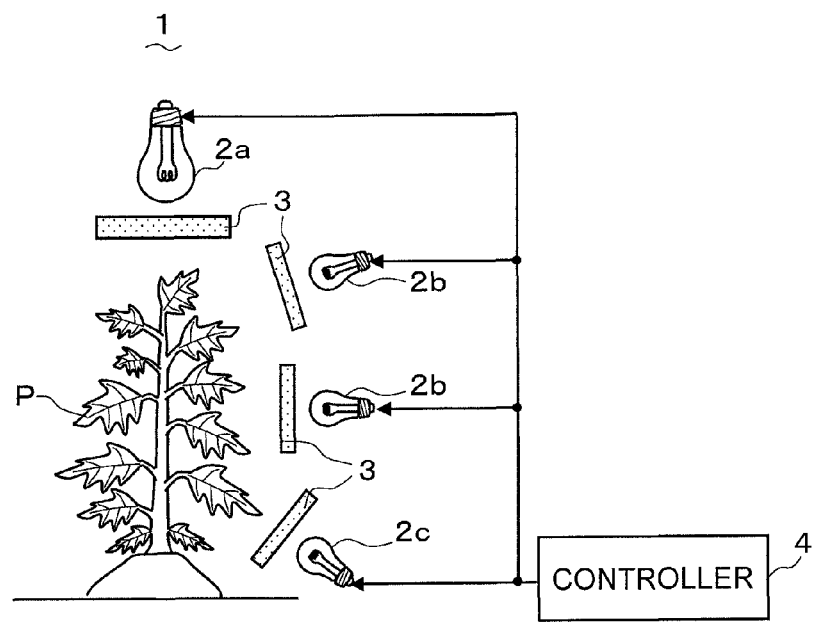
FIG. 3 is a diagram showing another layout example of the light source of the lighting apparatus in FIG. 1.

The plant P is irradiated with the light from an upper side, so that the light source 2 and the filter 3 are basically located above the plant P, however, the location of the light source 2 and filter 3 is not limited to the above. When the plural plants P are planted and grown close relatively, the light source 2 which irradiates the plants P only from the upper side of the plants P cannot sufficiently irradiates a lateral and bottom sides of the plants P which are adjacent to each other by reason that the plants P fall under shadow of the plants P themselves, and thereby there is a possibility that the lateral and bottom sides of the plants P are affected by a disease compared to the other part of the plants P. Thus, in such a case, as shown in FIG. 3, it is preferable to set up the light source 2 and the filter 3 on the lateral and bottom sides of the plant P as well as the upper side of the plant P. Hereinafter, the light sources 2 which are located on the upper, lateral, and bottom sides of the plant P to irradiate the upper side, the lateral side, and the bottom side of the plant P are referred to as an upper light source 2a, a lateral light source 2b, and a bottom light source 2c, respectively. The upper light source 2a, the lateral light source 2b, and the bottom light source 2c are controlled together or independently by the controller 4 so that the total amount of UV-B and UV-C emitted to the area in the plant P by the upper light source 2a, the lateral light source 2b, and the bottom light source 2c comes to 50 $\mu W/cm^2$ or less per each light source. Two lateral light sources 2b and one bottom light source 2c are illustrated in FIG. 3, however, the number of the lateral light source 2b and bottom light source 2c is not limited to the above, and one or more light sources are also applicable, respectively.

Figure 4:
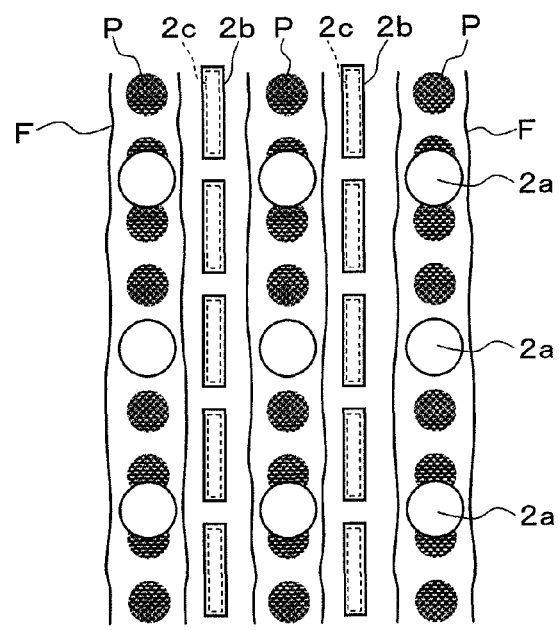
FIG. 4 is a diagram showing still another layout example of the light source of the lighting apparatus in FIG. 1.

When the plural plants P are planted along furrows F, it is preferable to set up the plural upper light sources 2a, lateral light sources 2b, and bottom light sources 2c as shown in FIG. 4, respectively. The plural upper light sources 2a are set up at a predetermined interval along the furrows F, and the plural lateral light sources 2b and bottom light source 2c are set up approximately in parallel with the furrows F, in other words, approximately in parallel with the rows of plants P. The lateral light source 2b and the bottom light source 2c are made up of a waterproof fluorescent lamp which is covered with a cylinder or the like, for example, and form lines approximately in parallel with the furrows F. The lateral light source 2b and the bottom light source 2c can also be made up of a light source such as a lighting equipment having hollow light guide system or an electroluminescent (EL) equipment having optical fiber system or having elongate shape, for example. As described above, the upper light source 2a, the lateral light source 2b, and the bottom light source 2c are set up in rows, so that even when the plural plants P are planted over a wider range than the area irradiated by each light source, the lateral and bottom sides of the plants P can be irradiated with the light reliably.

A time for irradiating the plant P with the light from the light source 2 is controlled by a timer (not shown), for example. In accordance with the timing of the timer, electrical power to the light source 2 is supplied or stopped, and the light control is performed to the light source 2. It is also applicable to adjust a light distribution and light volume of the light source 2 in accordance with the growth of the plant P. For example, when the plant P does not grow yet and is still small in an early stage of growth, the upper light source 2a is turned off and the lateral light source 2b and the bottom light source 2c are turned on, and additionally, a mounting angle of the lateral light source 2b and the bottom light source 2c is adjusted, for example. According to the above configuration, a spread of light is controlled and the light volume which irradiates the plant P is reduced. As the plant P grows up, the upper light source 2a is also turned on and the mounting angle of the lateral light source 2b and the bottom light source 2c is adjusted, for example, and thus the light distribution is enlarged and the light volume which irradiates the plant P is increased. The method for adjusting the light distribution and light volume of the lateral light source 2a and bottom light source 2c is not limited to the above example, however, when the light volume of the upper light source 2a is small or when the plant P needs relatively large amount of light, the upper light source 2a can be turned on even in the early stage of growth.

It is preferable that the lighting apparatus 1 is set up in an agricultural plastic greenhouse or a glass house, for example (abbreviated as the house hereinafter) which can block out the UV-A from solar ray to ensure the effect to controlling the plant disease more reliably. When the lighting apparatus 1 is used in the above house, the UV-A which is included not only in the light with which the plant P is irradiated by the lighting apparatus 1 but also in the sunlight provided from the sun to the plant P is cut off, so that the filamentous fungi can be controlled more effectively.

When light intensity of UV-C in which the wavelength component of approximately 255 nm or less is cut off and the UV-B is high, there is a possibility of causing damage to a human body, for example, eyes and skin. Thus, it is preferable that a light shield plate and a human detection sensor switch are set up in the house and electrically connected to the lighting apparatus 1 so that the light distribution is controlled to prevent a worker from being irradiated with the light of the light source 2 or the light source 2 is turned on only when the worker is not in the house. The above control enables a safety ensuring of the worker in the house.

Figures 5, 6:
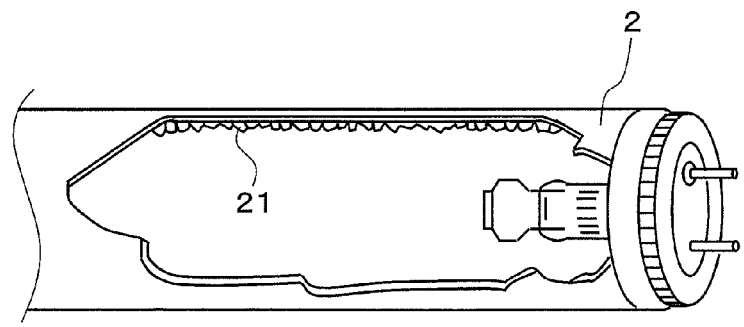
FIG. 5 is a table showing a ratio of damaged plants and a ratio of leaf scorch of plants when being irradiated with a light by the lighting apparatus in FIG. 1.
FIG. 6 is a partial cross sectional view of a fluorescent lamp used as the light source in FIG. 2.

FIG. 5 shows a ratio of damaged plants and a ratio of leaf scorch of plants in case of using an agricultural chemical, in case of a light irradiation by a conventional lighting apparatus, and in case of a light irradiation by the lighting apparatus 1 according to the present preferred embodiment. In the experiment, the number of plants is approximately 100 in each test section, and strawberry is used as a crop under test. The ratio of damaged plants is obtained by dividing the number of damaged plants by the number of plants in each test section, and the ratio of leaf scorch of plants is obtained by dividing the number of leaf scorch of plants by the number of plants in each test section.

When using the agricultural chemical as the conventional method, the ratio of damaged plants is 5 to 20% and the ratio of leaf scorch of plants is 0%. When irradiating the crop under test with only the UV-B such as the light irradiation by the conventional lighting apparatus, the ratio of damaged plants is 5 to 10% and the ratio of leaf scorch of plants is 5 to 50%. In contrast, when irradiating the crop under test with the UV-C in which the wavelength component of approximately 255 nm or less is cut off and the UV-B such as the light irradiation by the lighting apparatus 1 according to the present preferred embodiment, the ratio of damaged plants is reduced to 0 to 3%. The ratio of leaf scorch of plants is 10 to 60%.

As shown in the above experimental result, in the present preferred embodiment, the plant is additionally irradiated with the ultraviolet rays having the wavelength range of approximately 255 to 280 nm compared to the conventional lighting apparatus, so that the spore formation and the hyphal growth of the filamentous fungi which cause gray mold, powdery mildew, downy mildew, anthracnose, or the like can be inhibited more reliably and moreover, the disease resistance of the plant can be induced more reliably. Furthermore, the total amount of UV-B and UV-C emitted to the area in the plant P comes to 50 $\mu W/cm^2$ or less, so that the plant can be irradiated with the appropriate amount of UV-C and UV-B.

Furthermore, in the present preferred embodiment, the plant is irradiated with the ultraviolet rays which include almost no wavelength component in the range of UV-A, which promotes the spore formation of the filamentous fungi, so that the spore formation and the hyphal growth of the filamentous fungi can be inhibited more effectively and the spread of the plant disease can be reduced, and ultimately, crop yields can be increased. The light including the UV-A has an effect to attract insects, so that the insect attraction is inhibited by blocking out the UV-A, and damage from a pest can thereby be reduced.

When the light source 2 is made up of the fluorescent lamp, as shown in FIG. 6, it is also applicable to apply a fluorescent material 21, which has characteristics of emitting a light having almost no wavelength component of approximately 255 nm or less in the range of UV-C and no wavelength component in the UV-A range (the wavelength range of approximately 340 to 380 nm), to an inner side of a fluorescent tube of the fluorescent lamp, instead of setting up the filter 3. In the above fluorescent lamp, at first, an electron is emitted by an electrical discharge, and a mercury atom receives energy of the electron and emits ultraviolet rays, and then the fluorescent material 21 absorbs the ultraviolet rays and ultimately emits the above light.

The light source 2 can also be made up of a general-purpose lamp which emits a light including ultraviolet rays without limiting the light source 2 particularly. In this case, a filter which transmits the UV-B having the wavelength component of approximately 280 to 340 nm and the UV-C in which the wavelength component of approximately 255 nm or less is cut off in the UV-C having the wavelength of approximately 100 to 280 nm in a light emitted by the lamp (a second filter) is used as the filter 3. According to the above configuration, the light having the wavelength of approximately 255 nm or less is cut off. When using the metal halide lamp (Skybeam manufactured by Matsushita Electric Industrial Co., Ltd.), the xenon lamp, or the like which has relatively large amount of luminous flux and also includes relatively large amount of wavelength component having ultraviolet range of approximately 255 nm or less as the light source 2, the filter 3 is effective.

Next, a lighting apparatus 1 according to the second preferred embodiment is described. The illustration of the lighting apparatus 1 according to the present preferred embodiment is omitted. The lighting apparatus 1 according to the present preferred embodiment is different from that of the first preferred embodiment in that the filter 3 also blocks out visible light having a wavelength range of approximately 380 nm or more in the light emitted by the light source 2. When the light source 2 emits the ultraviolet rays having a wavelength range of approximately 280 to 340 nm (UV-B) as shown in the above FIG. 2, there is a possibility that the light source 2 also emits the light in the visible light range having a wavelength of approximately 380 nm or more, and the visible light having a wavelength of around 550 nm highly attracts insects. Accordingly, in the present preferred embodiment, the wavelength component of approximately 380 nm or more is set to almost zero by the filter 3, so that the insect attraction can further be inhibited compared to the first preferred embodiment. Also in the present preferred embodiment, in the same manner as the first preferred embodiment, the spore formation and the hyphal growth of the filamentous fungi which cause gray mold, powdery mildew, downy mildew, anthracnose, or the like can reliably be inhibited and moreover, the disease resistance of the plant can reliably be induced, and furthermore, the plant can be irradiated with the appropriate amount of UV-C and UV-B.

Figures 7, 8:
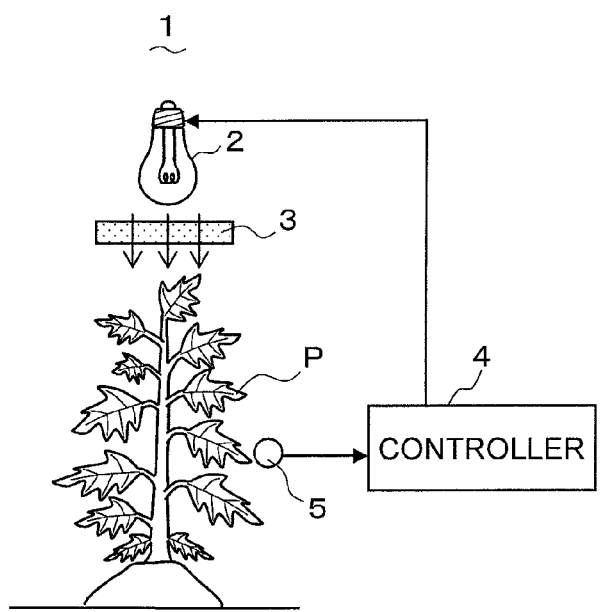
FIG. 7 is a configuration diagram of a lighting apparatus for controlling a plant disease according to a third preferred embodiment of the present invention.
FIG. 8 is a table showing a ratio of damaged plants and a ratio of leaf scorch of plants when being irradiated with a light by the lighting apparatus in FIG. 7.

Subsequently, a third preferred embodiment of the present invention is described with reference to FIGS. 7 and 8. FIG. 7 shows a configuration of a lighting apparatus 1 according to the present preferred embodiment. In FIG. 7, identical codes are applied to the components which are identical with that of the first or second preferred embodiment. The lighting apparatus 1 in the present preferred embodiment is different from that of the first and second preferred embodiment in that it further has an illuminance sensor 5 which detects an illuminance of a proximity of the plant P and a controller 4 performs a light control of a light source 2 in accordance with detection signals from the illuminance sensor 5.

The illuminance sensor 5 is set up in proximity to the plant P and sends out the detection signals to the controller 4 when detecting the visible light whose light volume exceeds a predetermined threshold value. By performing the light control of the light source 2 by the controller 4 based on the detection signals, the light source 2 emits the ultraviolet rays only when the illuminance sensor 5 detects the visible light. The lighting apparatus 1 can also include a light source which emits an artificial light such as white light, for example, and irradiate the plant P with the ultraviolet rays and the visible light all at once when the illuminance sensor 5 detects the light from the light source or natural light, so that the plant P can be irradiated with the ultraviolet rays during not only daytime but also nighttime.

FIG. 8 shows a ratio of damaged plants and a ratio of leaf scorch of plants when being irradiated with a light by the lighting apparatus 1 according to the present preferred embodiment. A condition in this experiment is the same as that described in the first preferred embodiment. When irradiating the crop under test with the UV-C in which the wavelength component of approximately 255 nm or less is cut off, the UV-B, and the visible light according to the present preferred embodiment, the ratio of damaged plants is 0 to 3% and the ratio of leaf scorch of plants is 0 to 0.5%, which is a significant reduction compared to the lighting apparatus 1 according to the first preferred embodiment 1.

As shown in the above experimental result, in the present preferred embodiment, the plant P is irradiated with the ultraviolet rays at the same time as being irradiated with the visible light including the natural light compared to the lighting apparatus 1 according to the first preferred embodiment, so that the growth inhibition caused by the single irradiation of the ultraviolet rays can be prevented. The present preferred embodiment can also have the same effect as the first or second preferred embodiment.

The present invention is not limited to the configuration of the above preferred embodiment, however, various modification are applicable in accordance with the intended use. For example, the plant P can also be irradiated with the ultraviolet rays in accordance with the case that the plant P is irradiated with the visible light including the natural light by a combination of the illuminance sensor 5 and the timer or by using the timer singularly.

The present invention is based on Japanese Patent Application No. 2007-186021, and as a result, the subject matter is to be combined with the present invention with reference to the specification and drawings of the above patent application.

Although the present invention is fully described by the preferred embodiments with reference to the accompanying drawings, it is clear to the person having ordinary skill in the art that the various changes and modifications are applicable. Consequently, such changes and modifications do not depart from the scope of the present invention but are to be included in the scope of the present invention.

The invention claimed is:

1. A lighting apparatus for controlling a plant disease provided with a light source to emit a light including ultraviolet rays, wherein
the light source emits superimposedly UV-B having a wavelength component of approximately 280 to 340 nm and UV-C having a wavelength component of approximately 100 to 280 nm wherein a wavelength component of approximately 255 nm or less is cut off,
the lighting apparatus comprising an illuminance sensor which detects an illuminance in proximity to a plant; and
a controller that controls the light source to be turned on when the illuminance sensor detects visible light.

2. The lighting apparatus for controlling the plant disease according to claim 1, wherein the controller controls the light source so that a total amount of UV-B and UV-C emitted to an area in the plant by the light source is 50 μW/cm$^2$ or less.

3. The lighting apparatus for controlling the plant disease according to claim 2, comprising a first filter which controls a wavelength of the light emitted by the light source, wherein the first filter blocks out UV-A having a wavelength component of approximately 340 to 380 nm in the light emitted by the light source.

4. The lighting apparatus for controlling the plant disease according to claim 3, wherein
the first filter blocks out visible light having a wavelength range of approximately 380 nm or more in the light emitted by the light source.

5. The lighting apparatus for controlling the plant disease according to claim 4, wherein
the light source comprises at least one of a fluorescent lamp, a mercury lamp, a metal halide lamp, and a xenon lamp which emit the UV-B and the UV-C.

6. The lighting apparatus for controlling the plant disease according to claim 4, wherein
the light source comprises a lamp which emits a light including ultraviolet rays and a second filter which transmits UV-B having a wavelength component of approximately 280 to 340 nm and UV-C having a wavelength component of approximately 100 to 280 nm wherein a wavelength component of approximately 255 nm or less is cut off, in a light emitted by the lamp.

7. The lighting apparatus for controlling the plant disease according to claim 1, wherein
the light source is provided on an upper side, a lateral side, and a bottom side of a plant which is an object to be irradiated.

8. The lighting apparatus for controlling the plant disease according to claim 7, wherein the controller controls the light source so that a total amount of UV-C and UV-B emitted to an area in the plant by the light source is 50 μW/cm$^2$ or less.

9. The lighting apparatus according to claim 1, wherein the luminance sensor outputs a detection signal to the controller, when a light volume of detected visible light exceeds a predetermined threshold value, and
the controller controls the light source to emit ultraviolet rays, based on the detection signal.

10. The lighting apparatus according to claim 1, further comprising a second light source that emits white light,
wherein the luminance sensor detects the visible light emitted from the second light source, and
the controller controls the light source to emit ultraviolet rays together with the white light emitted by the second light source so that the ultraviolet rays and the white light are irradiated on the plant at the same time.

* * * * *